United States Patent [19]

Longinotti

[11] 3,970,223

[45] July 20, 1976

[54] MATERIAL METERING UNITS

[75] Inventor: Enrico Longinotti, Florence, Italy

[73] Assignee: Longinotti S.p.A., Italy

[22] Filed: Mar. 24, 1975

[21] Appl. No.: 561,655

[30] Foreign Application Priority Data

Apr. 4, 1974 Italy .................................. 9392/74

[52] U.S. Cl. .............................. 222/306; 214/1 BT; 425/258

[51] Int. Cl.² .......................................... G01F 11/18

[58] Field of Search .................... 222/305, 306, 409; 141/108, 67, 129, 392; 214/1 BS, 1 BT, 1 BH, 1 BR; 425/258

[56] References Cited

UNITED STATES PATENTS

| | | | |
|---|---|---|---|
| 877,579 | 1/1903 | Lorenz | 214/1 BS |
| 2,927,707 | 3/1960 | Reed et al. | 214/1 BS |
| 2,948,337 | 8/1960 | Wolter | 214/1 BV |
| 2,951,260 | 9/1960 | Harrison et al. | 425/258 |
| 3,571,839 | 3/1971 | Hartman et al. | 214/1 BS |

*Primary Examiner*—Allen N. Knowles
*Attorney, Agent, or Firm*—McGlew and Tuttle

[57] ABSTRACT

A semi-dry material metering unit for tile presses comprises means for separating a material charge from a bulk of the semi-dry material in a manner such as to permit the volume and shape of the charge to be readily changed. The metering unit further comprises an air-permeable mesh which is impermeable to the semi-dry material and against which the separated charge can be held by suction during transfer to a mold. While held against the air-permeable surface, the charge maintains its shape, and thus the distribution of material when discharged into the mold can be controlled.

15 Claims, 10 Drawing Figures

MATERIAL METERING UNITS

BACKGROUND OF THE INVENTION

1. Field of the Invention

This invention relates to a material metering unit for use in the manufacture of cement or ceramic tiles.

2. Description of the Prior Art

Tile presses are known for manufacturing cement tiles from one or two layers of material. Where two layers are used, in general one of these layers is a semi-liquid layer and the other one is damp or wet and is termed a semi-dry layer. Alternatively, the two layers can both be wet and have differing granularities and/or they can differ in the quantity of material used. Tiles or panels can also be manufactured using a single wet layer only.

Tiles similar to stoneware or for subsequent enamelling can be made using a single cement-free wet layer.

In the manufacture of two layer cement tiles, the semi-liquid layer is first introduced into a mold by an automatic metering unit and the amount of the material in this layer can be readily varied by altering the capacity of the metering or dosage container. The semi-dry layer (whose moisture or humidity can be as high as 10%) is then introduced into the mold, by a loader which completely fills the unoccupied mold space with the semi-dry material. The quantity of material in this second layer can only be varied by changing the height of the mold frames, the material feed system being based upon a complete filling of the mold space. Thus to modify the depth of a product requires the mold frames to be changed but even this does not ensure that the thickness of a finished product is as desired, since the thickness of the product is also dependent on the granularity of the material and the moisture content of the wet layer.

Similar problems of mold filling are also encountered in, for example, the manufacture of ceramic tiles and the like.

It has been previously proposed to overcome the need to change the mold frames, upon a variation in the quantity of material in a mold being required, by using mold frames of increased height and these frames will be only partially filled to a required level whereby to meter the amount of material to be molded. In this previously proposed method, a sieve is adjustably positioned inside the mold and the mold is then filled with material via the sieve which must be vibrated in order for the material to pass therethrough.

The sieve is vibrated for a predetermined time after which vibration is stopped and the sieve is lifted out of the mold. Semi-dry material now fills the mold up to the level at which the sieve was positioned in the mold. However, this method of mold filling with a metered quantity of material has not proved fully satisfactory.

Since the damp semi-dry material does not readily 'flow' around inside a mold to give an even distribution of material therein, in addition to metering the semi-dry material, it must also be introduced into the mold in an evenly distributed manner, and known semi-dry material units do not achieve such a material distribution.

Further, with known tile presses it is not possible to use multiple or low mold frames to make thin products since reduction of the thickness of the mold frames reduces quadratically the frame strength. A high frame strength is necessary since the frames must be firmly clamped against the rubber mold bottoms to obtain a perfect seal between the frames and bottoms during pressing to produce "green" tiles.

In metering units incorporating a chest which is arranged to slide across the top of a mold frame to allow material in the chest to fall into and totally fill the mold, the first layer introduced into the mold with a no-too-dense consistency, in order to make it easier for it to lie down or spread thicker, is entrained and piled up in the direction of motion of the loading chest of the second layer. On the resulting molded tiles, there is both a different thickness of the first layer and a different specific pressing and also a smaller total thickness of the tiles in the zone with a smaller thickness of the first layer. Secondly, along the walls of the frame which are transversal with respect to the chest motion, there is some unevenness in the density of the semi-dry material, owing to the compression of the material due to the coaction between the transversal walls of the frame and chest.

SUMMARY OF THE INVENTION

According to the invention there is provided a metering unit for semi-dry material, comprising means for delimiting a charge of semi-dry material of predetermined volume and shape and for transferring the charge to a discharge position beneath which a mold to be charged can pass. The means including a surface permeable to air but impermeable to semi-dry material, and suction means for creating a suction effect through the permeable surface whereby semi-dry material of the charge can be held against the surface during transfer to the said discharge position.

According to the invention there is also provided a semi-dry material metering unit for a tile press, comprising means for separating from a bulk of the semi-dry material a charge of a predetermined volume and material distribution, means for transferring the charge to a position beneath which a mold to be filled can be arranged, the transfer means enabling the charge to be gravity fed into the mold while substantially retaining the said distribution of material within the charge, the transfer means including an air-permeable surface which is impermeable to the material, suction means for creating a suction effect through the the surface whereby the charge can be held thereagainst with its the material distribution maintained, and means for shutting off the suction effect whereby material held against said surface can fall away therefrom.

BRIEF DESCRIPTION OF THE DRAWINGS

A tile press metering unit embodying the invention will now be particularly described, by way of example, with reference to the accompanying drawings in which.

DESCRIPTION OF THE PREFERRED EMBODIMENTS

Figure 1:
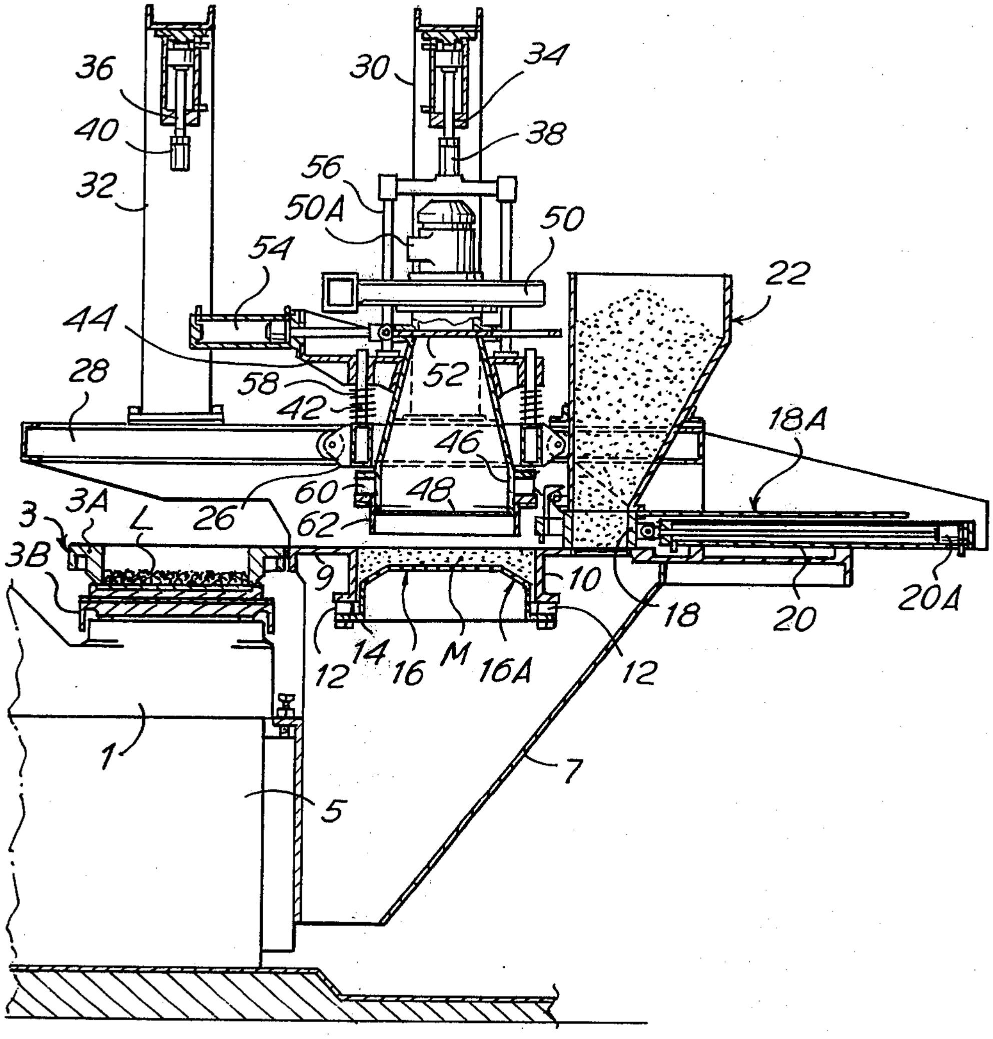
FIG. 1 is a vertical section through a part of the press including the metering unit.

As shown in FIG. 1, the tile press comprises a rotary table 1 carrying a plurality of molds or dies 3. Each mold 3, which can be of a conventional type used in presses for cement tile manufacture, includes a frame 3A and a bottom 3B having an upper sealing layer on which the frame 3A lies. A plurality of molds is arranged around the rotary table 1 such that each mold can be successively moved to several operational stations in a known manner. The metering unit forms one of these operational stations and in FIG. 1 a mold 3 is shown positioned at the metering unit and partly filled with semi-liquid material L (which may include cement grout and grit). The metering unit is arranged to further fill the mold 3 with semi-dry material to a level below the maximum capacity of the mold 3.

The rotary table is supported on a press base structure 5 which also supports the metering unit. A bracket 7 mounts the metering unit on the base structure 5. The bracket 7 has a horizontal table 9 the upper surface of which is level with the upper surface of the frame 3A. A recess is formed in the table 9 and has side walls 10 to which a replaceable structure 14 is secured and spaced therefrom by means of spacers 12. The structure has a grid of mesh 16 which forms the bottom of the recess in the table 9. The mesh 16 is permeable to air but the semi-dry material to be metered by the unit cannot pass therethrough. The mesh 16 has an edge portion 16A inclined downwardly towards the walls 10. Thus the dosage container formed by the walls 10 and the structure 14 with its mesh 16 has a greater depth at its periphery than in its central zone. The depth and therefore the capacity of the dosage container can be varied both by changing the spacers 12 and by replacement of the structure 14.

A distribution chest 18 is slidable horizontally over the table 9 by means of a fluid-actuated piston-cylinder arrangement having a cylinder 20, a piston 20A, and a piston rod connecting the piston 20A and the chest 18. In a chest-filling position of the chest 18 (as shown in FIGS. 1 to 4 and 9) the chest is positioned on the surface 9 below a hopper 22 containing semi-dry material to be metered, and in this position material can pass into the chest 18 under the action of gravity. The size of the chest 18 in a direction orthogonal to the drawing plane of FIG. 1 is made slightly greater than the corresponding size of the dosage container formed by the elements 10 and 14, so that as the chest 18 is moved by its associated piston-cylinder arrangement from its chest-filling position (FIG. 1) to the position shown in FIG. 5, the material held in the chest can fall into and fill the dosage container. The chest 18 has a plate 18A which serves to close off the lower, unloading, aperture of the hopper 22, as the chest is moved across the table to fill the dosage container.

The chest 18 is rigidly connected by arms 24 (FIG. 5) to a carriage 26 slidable parallel to motion of the chest in guide-ways 28 supported by part of the structure which forms the bracket 7. The part of the bracket structure supporting the guide-ways 28 also carries the stationary hopper 22 and two uprights 30 and 32 with respective fluid-actuated piston cylinder arrangements 34 and 36. Each piston-cylinder arrangement 34 and 36 has a thrust head 38 and 40, respectively, which is connected to the piston of the arrangement and can be adjusted in position axially thereof.

Figure 2:
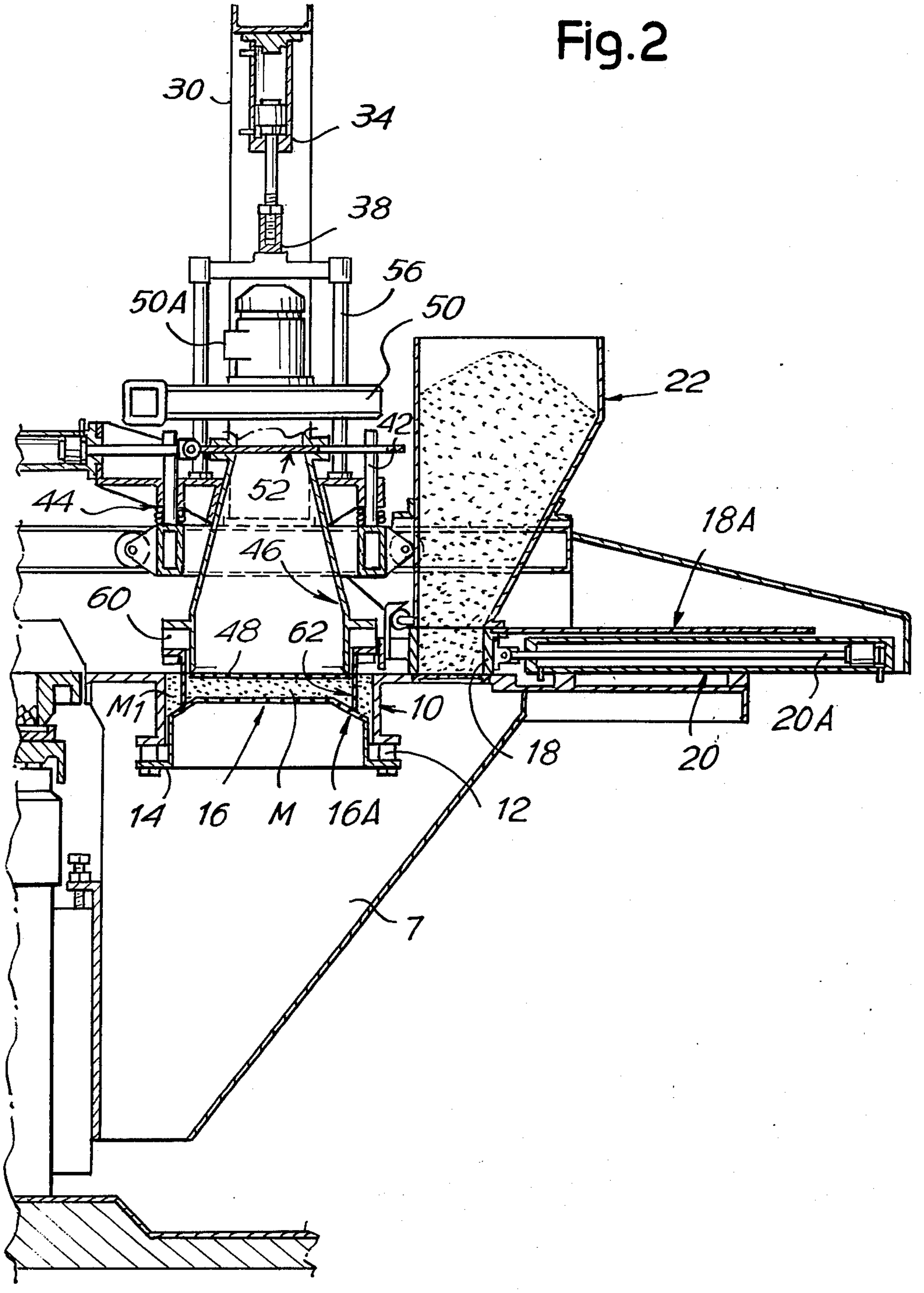
FIGS. 2 to 9 are sections corresponding to FIG. 1 but to an enlarged scale, and illustrate respective stages during an operational cycle of the metering unit.
Figure 3:
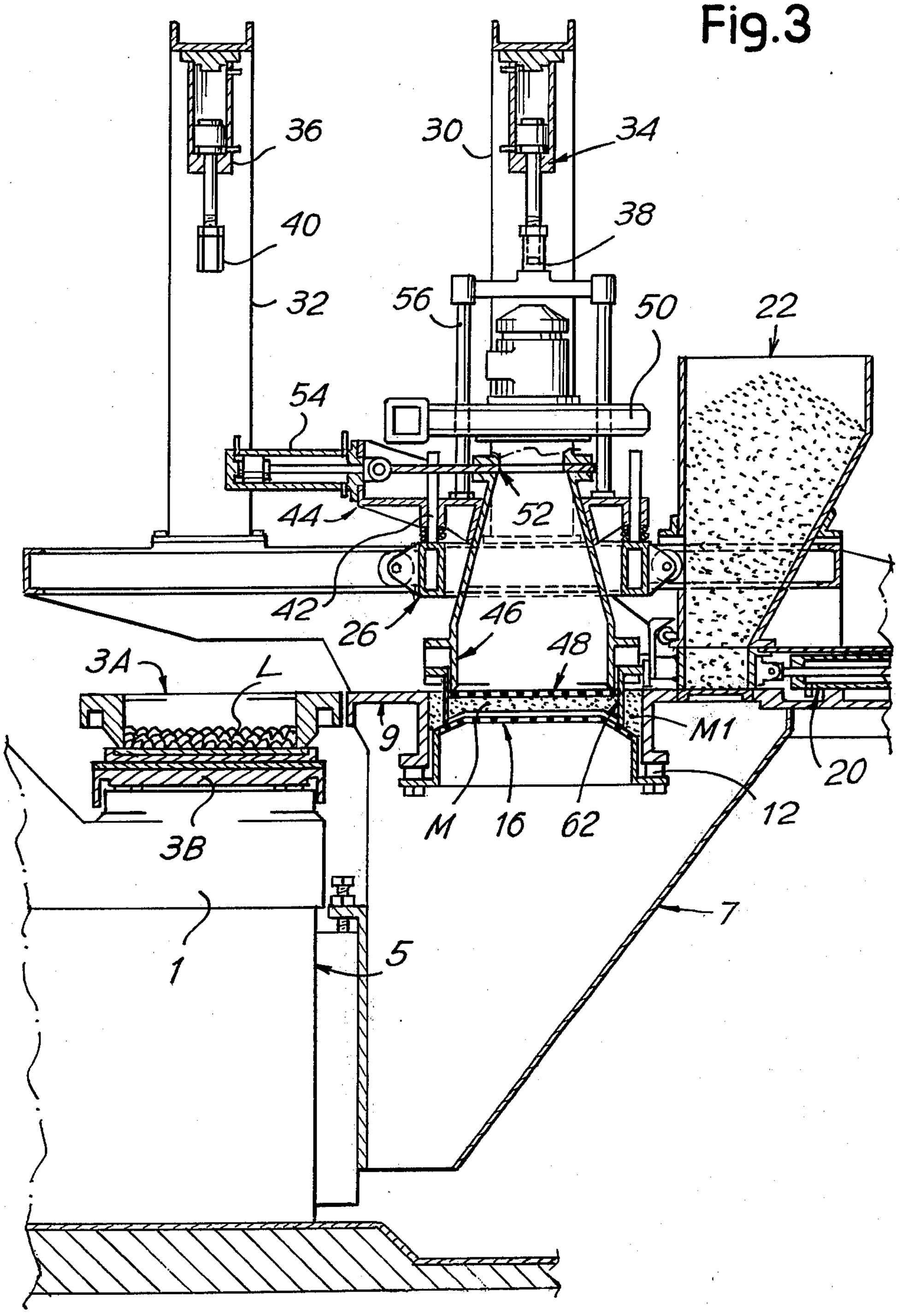

The carriage 26 has a frame on which are mounted vertical column guides 42 (FIG. 1 to 3). A structure 44 is vertically slidable on the guides 42 and comprises a downwardly-opening bell-shaped housing 46 having a permeable bottom 48 which forms a filter or mesh. The size of the permeable bottom 48 is only slightly less than that of the recess defined by the frame 3A of each of the molds 3 of the press. The top of the bell-shaped housing 46 communicates with a suction fan 50, driven by a motor 50A. The fan creates a low pressure zone within the bell 46 thus causing a suction effect through the permeable bottom 48. A gate shutter 52 is provided between the housing 46 and the fan 50, and opening and closing of the shutter is effected by a fluid-actuated piston-cylinder arrangement 54 mounted on the structure 44.

A frame 56 extends upwards from the structure 44 and is engageable by the head 38 of the piston-cylinder arrangement 34, or by the head 40 of the piston-cylinder arrangement 36, depending on the position of the carriage 26. The piston-cylinder arrangements 34 and 36 can force the structure 44 down the guide columns 42 against the action of springs 58 which urge the structure upwards. The structure 44 can be lowered by an amount such that the permeable bottom 48 of the housing 46 lies level with the table 9 and thus with the upper surface of the frame 3A.

As shown in FIGS. 1 to 8 a frame 62 forms an extension of the lower end of the housing 46. The frame 62 extends perpendicularly to the table 9 and can penetrate into material held in the dosage container. The frame 62 is secured to the housing 46 but is spaced therefrom by spacer 60. By suitable selection of the spacers 60 and also of the frame 62, it is possible to arrange for the lower edge of the frame 62 to touch or almost touch the structure 14 of the dosage container on the structure 44 being lowered into its lowest position.

The dimensions of the frame 62 are such that the frame can be inserted into the recesses of the frames 3A of the molds. The dimensions of the recess defined by the side walls 10 of the dosage container are such that with the frame 62 lowered into the dosage container, there exists a peripheral zone around the outside of the frame 62 from which material is not removed. However, a part of the inclined edge portion 16A of the mesh 16 does lie within or directly beneath the region enclosed by the frame 62 when lowered. The operation of the metering unit will now be described.

In FIG. 1 the metering unit is shown in a condition in which the dosage container formed by the walls 10 and the structure 14 has been filled with semi-dry material from the hopper 22. The material in the dosage container is ready to be picked up and transferred to the mold 3 which, as shown in FIG. 1, has already been moved to the metering unit, (alternatively the mold 3 may not have arrived as yet in position at the unit).

To transfer the material from the dosage container to the mold 3, the piston-cylinder arrangement 34 is first actuated to lower the structure 44 against the action of the springs 58, thus causing the frame 62 to penetrate into the material held in the dosage container. The structure 44 is shown fully lowered in FIG. 2 with the lower edge of the frame 62 touching or nearly touching the edge portion 16A of the mesh 16, and in this position the permeable bottom 48 of the housing 46 contacts the upper surface of the material in the dosage container.

The shutter 52, which has been in a closed position shutting off the fan 50 from the interior of the housing 46, is now slid open as a result of which a low pressure region is created in the housing 46 by the action of the fan 50. The resultant suction effect through the permeable bottom 48 causes the material enclosed by the frame 62 to be sucked upwards towards the bottom 48 and effectively detached from the mesh 16 (see FIG. 3). The amount of semi-dry material M which is held thus against the bottom 48 is predetermined by the volume enclosed by the mesh 16, the frame 62 and the permeable bottom 48, and thus it can be seen that a metering of the amount of material forming a material charge to be discharged into the mold 3 has occured. While the low pressure region within the housing 46 is maintained, the piston-cylinder arrangement 34 is next de-activated, resulting in the structure 44 being raised by the springs 58 to the position shown in FIG. 4.

The metered quantity of material M remains adherent to the permeable bottom 48 and maintains the form imparted to it by the shape of the mesh 16. In particular, due to the inclined edge portion 16A of the mesh 16, the material M has a peripheral region of greater thickness than its central region.

Figure 5:
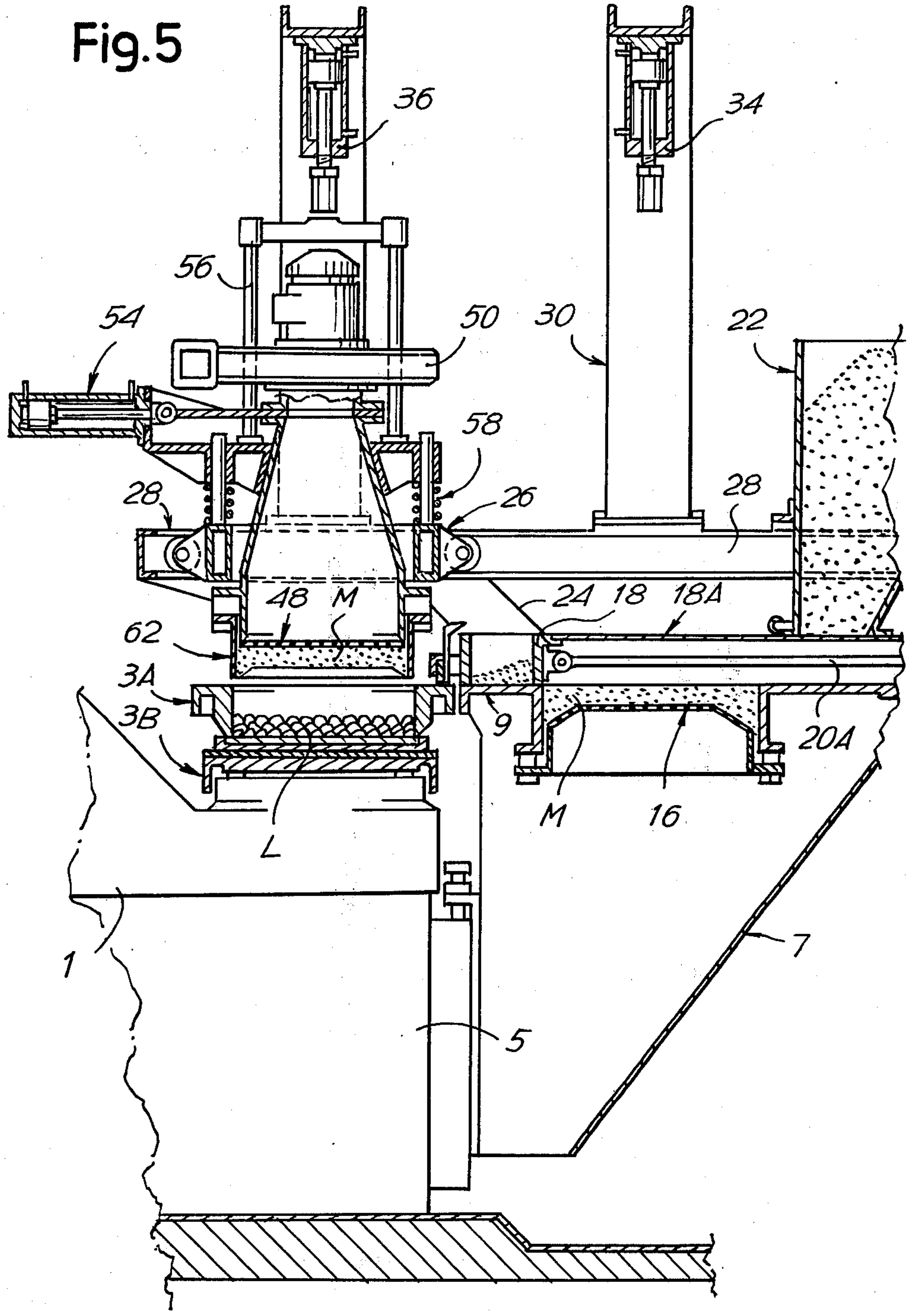
Figure 6:
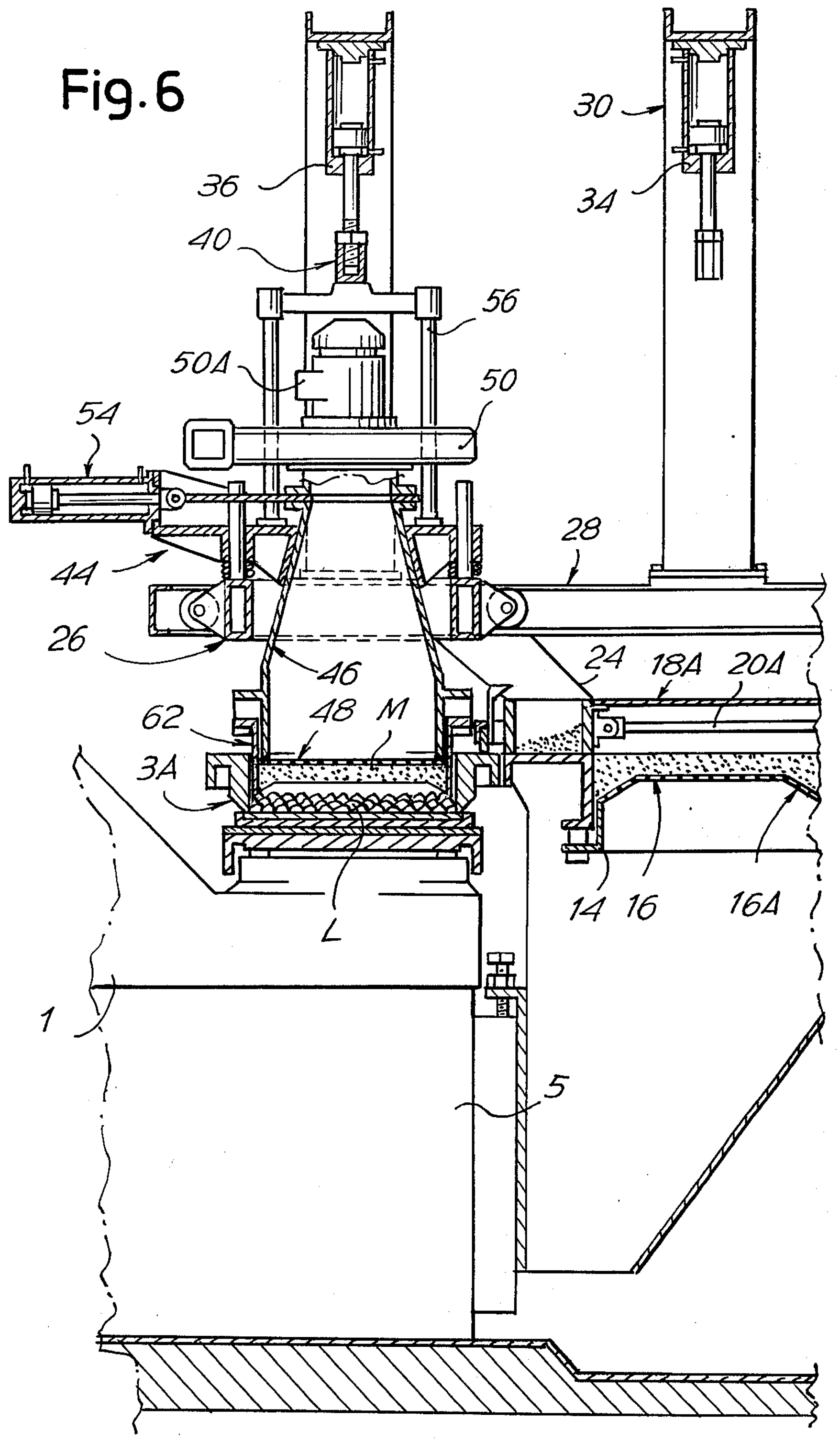

Following raising of the structure 44, the carriage 26 is moved along the guide-ways 28 until the housing 46 is so positioned that the frame 62 lies exactly above the recess within the frame 3A (as shown in FIG. 5). Simultaneously, the chest 18 (which has been previously filled with material from the hopper 22) is moved across the top of the dosage container thus resulting in the dosage container being substantially filled with material (the filling of the dosage container being completed on the return stroke of the chest).

The piston-cylinder arrangement 36 is then actuated causing the structure 44 to be lowered again. The frame 62 descends to just above the layer L of the material already in the mold (see FIG. 6). The shutter 52 is still open and thus a low pressure region still exists in the housing 46 and the material M is therefore still retained against the permeable bottom 48. The retained material M extends over practically the whole of the recess of the frame 3A of the mold.

Figure 7:
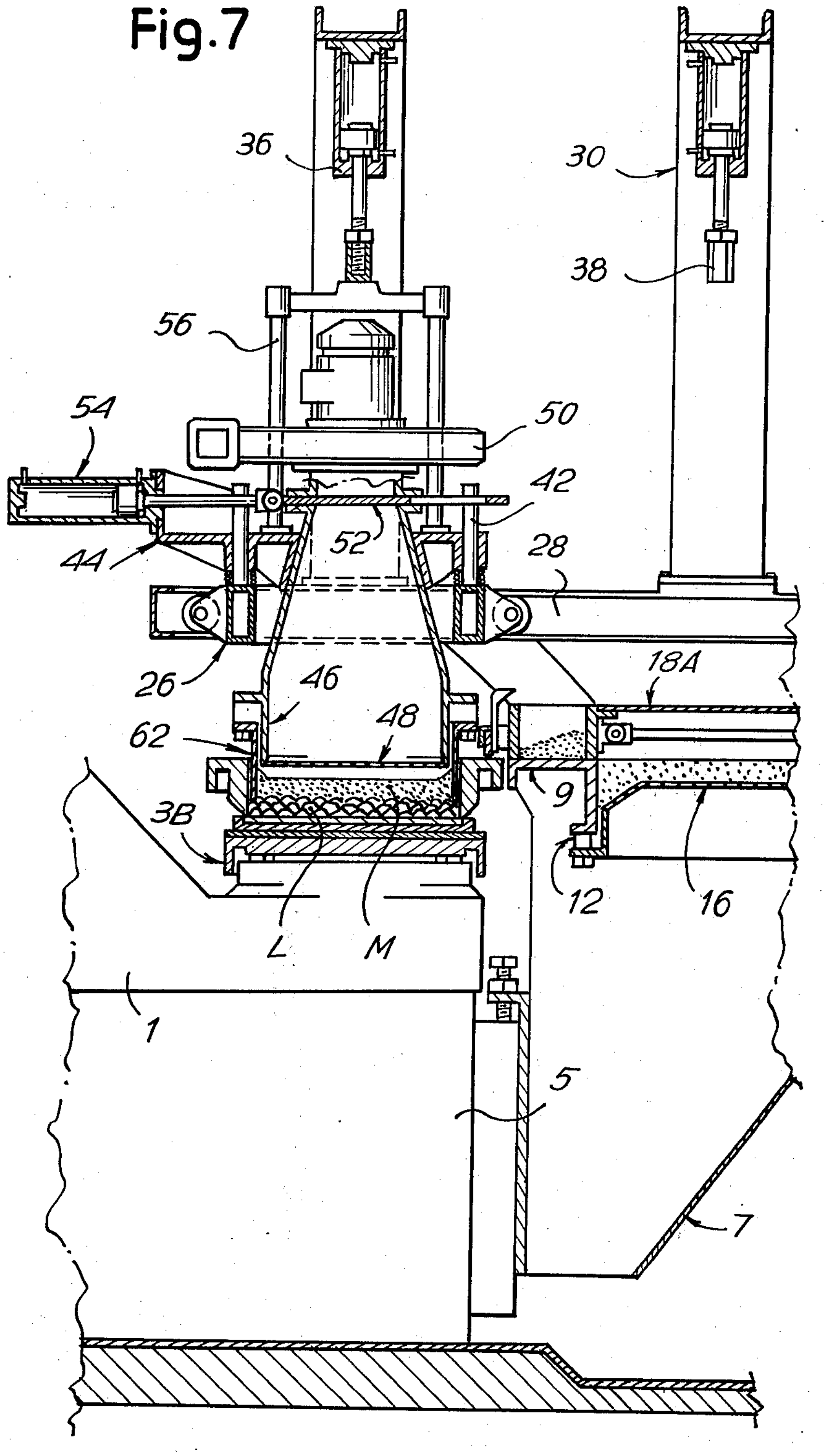

The shutter 52 is now closed as a result of which the metered material M falls away from the bottom 48 and onto the material L (see FIG. 7). Preferrably the fan is not stopped.

Figure 8:
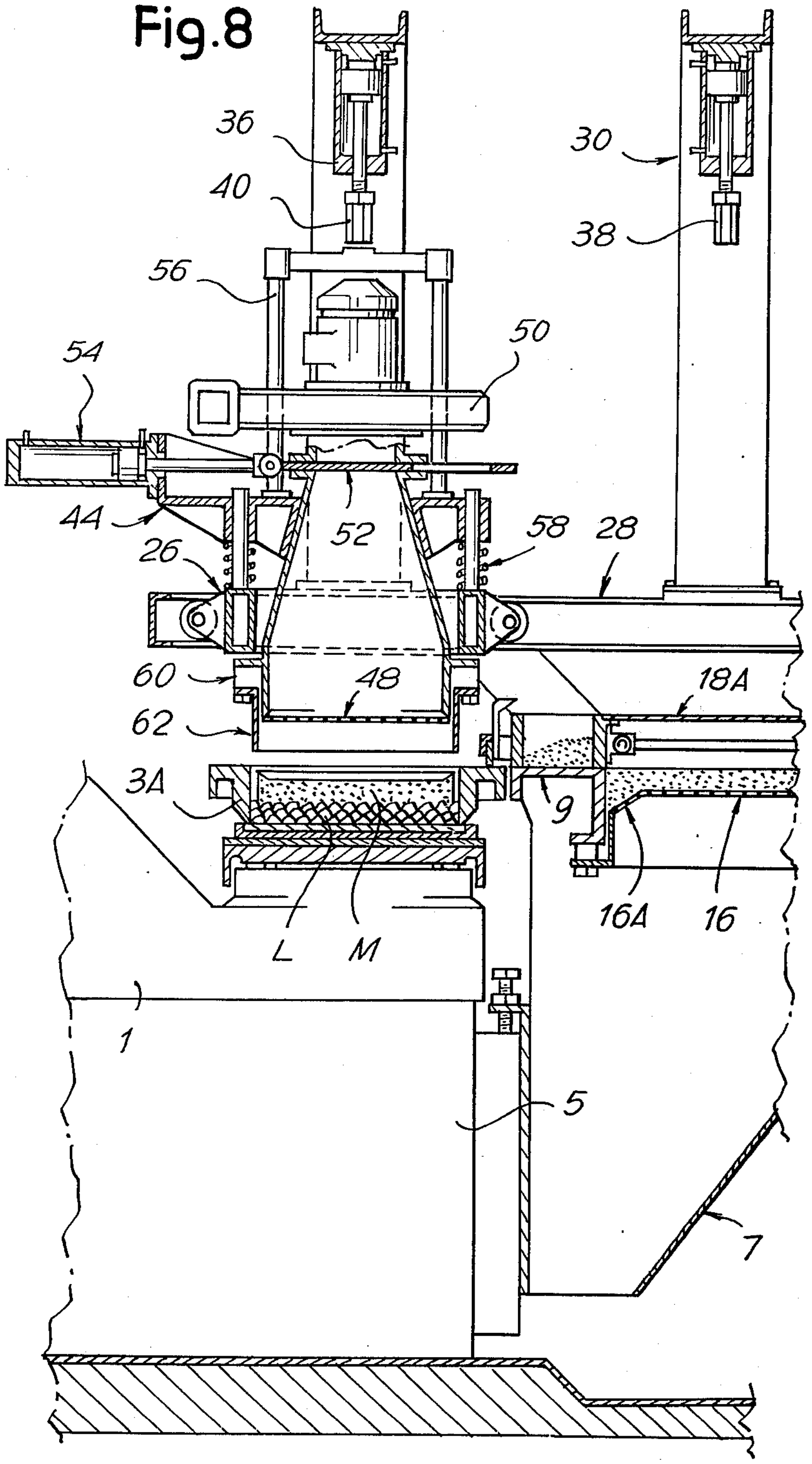

The piston-cylinder arrangement 36 is then deactivated resulting in structure 44 being raised under the action of the springs 58 to the position shown in FIG. 8. Material has thus been transferred into the mold 3 in a metered quantity, and owing to the metered quantity of material M maintaining, until its deposit on the layer L, the shape imparted thereto by the mesh 16 with its inclined edge portion 16A, the depth of the material within the mold following deposition of the material M therein is greater around the edge of the mold recess than in the centre. As a result during subsequent pressing of the material in the mold to form a green tile, a higher pressure can be applied around the tile peripheral portion which is thus less subject to defects and fractures.

Figure 9:
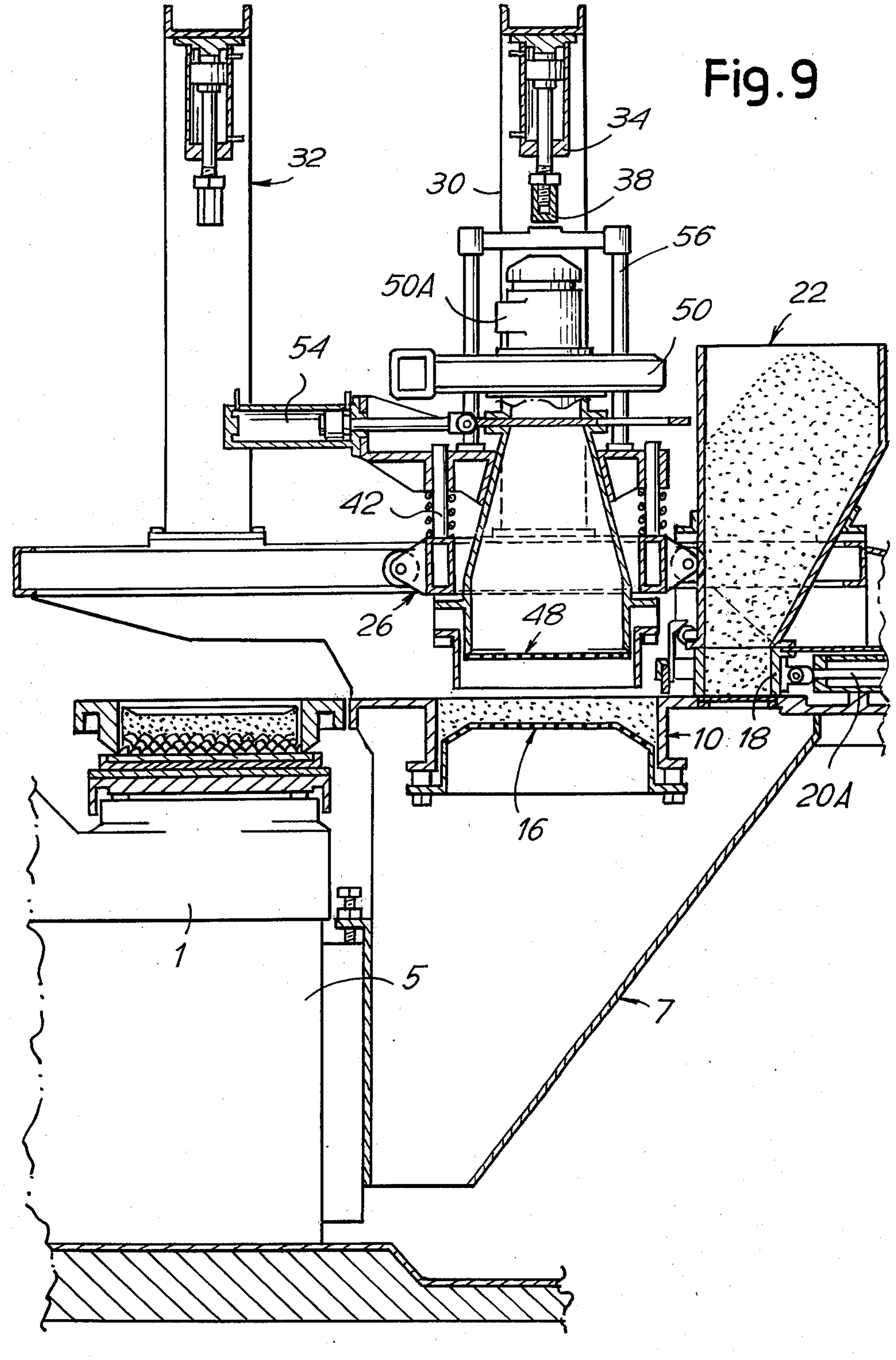

The metering unit is now returned to its initial condition shown in FIG. 1 by reversed motion of the carriage 26 along the guide-ways 28 to re-locate the housing 46 above the dosage container (see FIG. 9). During this return stroke filling of the dosage container is completed.

Figure 4:
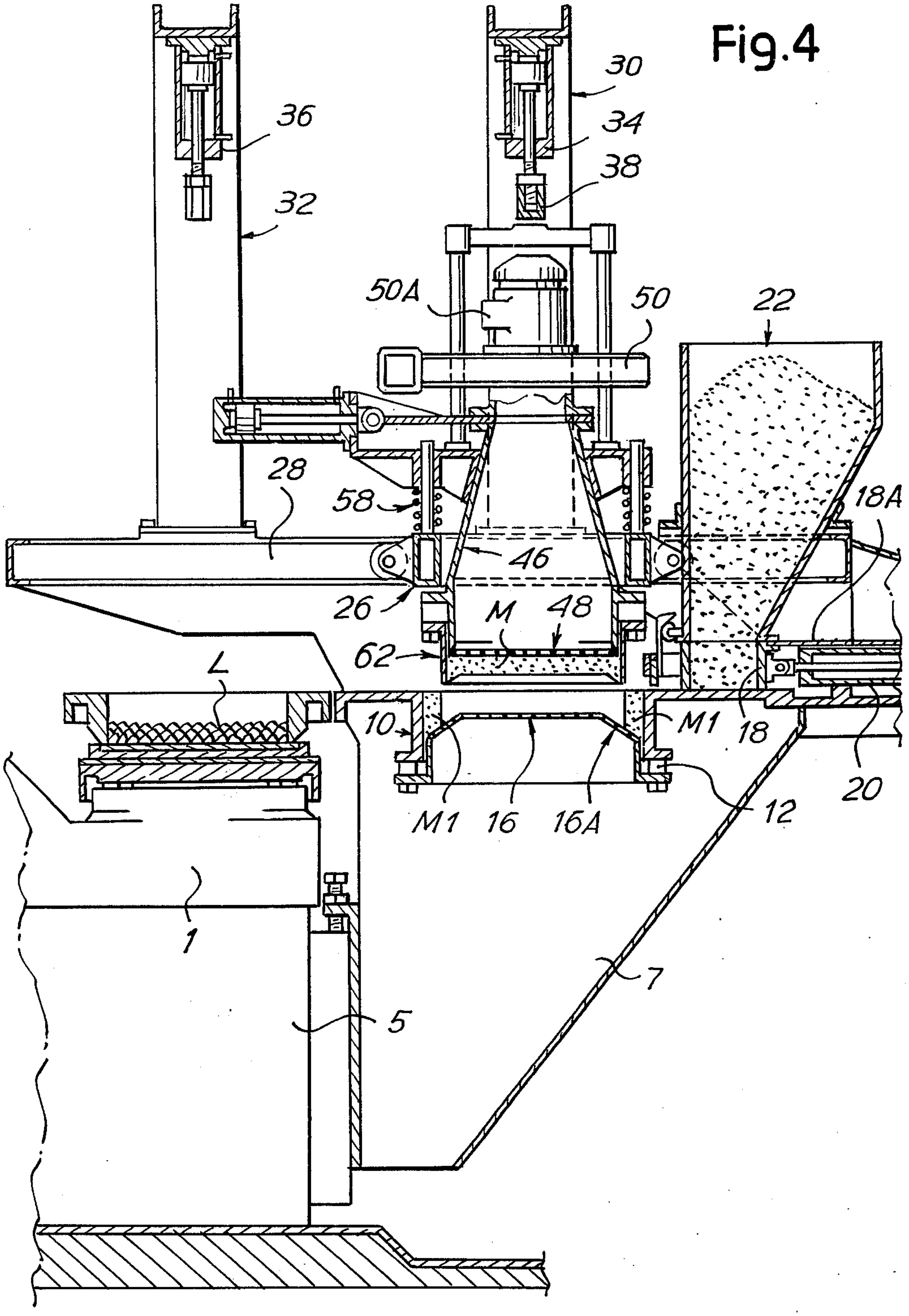

With reference to FIG. 4, it is to be noted that a portion M1 of the material in the dosage container remains therein and is not picked up. This portion M1 which is disposed adjacent at least the sides of the dosage container orthogonal to the direction of the motion of the chest 18, cooperates with material supplied by the chest 18 in subsequent filling of the dosage container.

The material portion M1 is excluded from the metered quantity M because the density of the portion M1 may differ from that of material filling the central zone of the dosage container, this density variation being due to a material packing effect caused by the movement of the walls of the chest 18 relative to the walls 10 during the to-and-fro motions of the chest 18 — the material M1 being more subject to this packing effect than the material in the central zone of the dosage container. The dimensions of the permeable bottom 48 and of the frame 62 are such that the material M1 is not included in the metered quantity of material.

Figure 10:
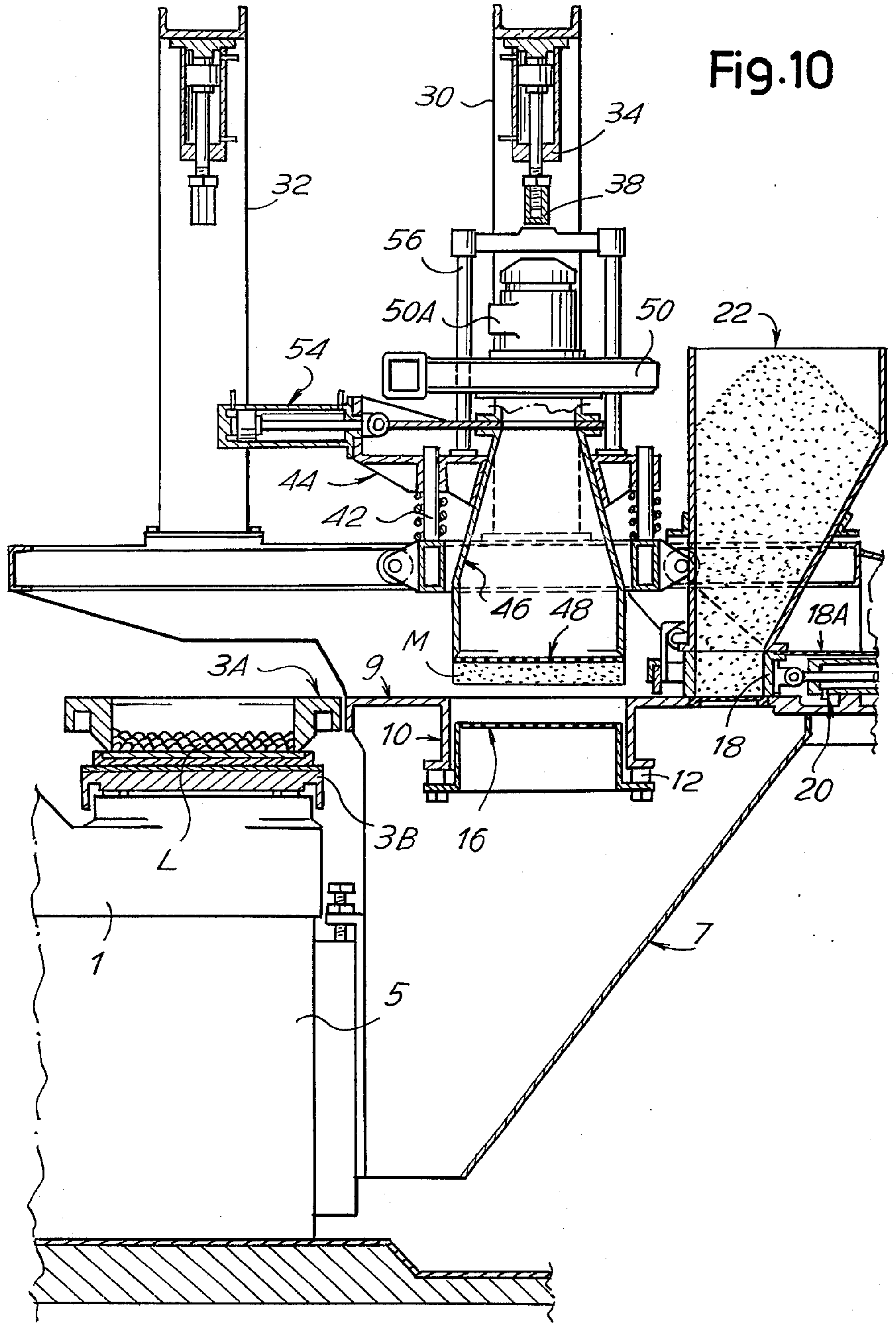
FIG. 10 is a section corresponding to FIG. 1, but to an enlarged scale, showing a modified form of the metering unit.

In the modified form of the metering unit shown in FIG. 10, the frame 62 is omitted and the dimensions of the dosage container in the plane of the table 9 are made equal to the corresponding dimensions of the frame 3 and of the permeable bottom 48 of the bell 46. Advantageously the walls 10 of the dosage container diverge slightly towards the top of the container to facilitate the removal of the metered quantity of the material M from the dosage container.

The dosage container is also provided with a flat mesh 16 rather than one with inclined edge portions. In this modification, by omission of the frame 62 protection of the picked-up metered quantity as provided by the frame 62 is lost.

In both of the described embodiments of the metering unit (FIGS. 1 to 9 and FIG. 10) the mesh can be raised on upward movement of the structure 44 (and that of the permeable bottom 48) during the pick-up of the metered quantity M. Such an arrangement facilitates material pick-up and is particularly advantageous with the modified form of metering unit (FIG. 10).

Alternatively to varying the amount of the metered quantity M by changing the size of the spacers 60 and 12, continuous adjustment means, for example screw means, can be used to effect desired variations in the quantity of material metered.

It is also possible to provide means for levelling off, at a distance from the permeable bottom 48, material held against the bottom 48 by suction. For example such means could be arranged to shave off material at a level of the lower edge of the frame 62.

If multiple molds are incorporated in the tile press (that is, more than one mold recess is operated on at any one time by a particular unit of the press) then the metering unit can be correspondingly provided with suitable forms of the dosage container and permeable bottom 48. Preferably a single housing 46 is used for all the zones of the permeable bottom 48 which correspond to respective mold recesses. To adapt the metering unit to a desired form and multiplicity of mold recesses, the form of the frame 62 and possibly also of the mesh 16 can be suitably varied. The size and shape of the dosage container recess defined by the walls 10 can, however, remain unaltered regardless of whether or not multiple recess molds are used, since the metering of material for variously shaped mold recesses is effected by the frame 62.

In a further modification of the metering unit, the dosage container can itself form the transfer means for transferring material in a metered quantity into the mold, the material being retained in the container during transporting by a suction effect which can be applied through the mesh 16. The dosage container, when also forming the transfer means, can be arranged to pivot about an axis distant from the axis of symmetry of the container to invert the container. Alternatively the dosage container can be pivoted about its axis of symmetry or an adjacent axis. Following inversion of the dosage container and translational movement thereof to above a mold the material held within the dosage container can be released into the mold.

The described metering unit is advantageous in that it allows the thickness of tiles or other products to be varied without the need for changing the mold frames. Further, it is possible to ensure a constant product thickness, even with variations of the inert materials or of the moisture content of the same since the amount of material in the wet layer can be quickly changed.

Using the described apparatus enables multiple mold frames to be used and also enables 'thin' products to be readily manufactured.

The described metering unit can be advantageously used for metering semi-dry material in the manufacture of green tiles, such as cement or ceramic tiles, with one or two layers.

I claim:

1. A metering unit for semi-dry material, comprising means for delimiting a charge of semi-dry material of predetermined volume and shape and for transferring said charge to a discharge position beneath which a mold to be charged can pass, said means including a surface permeable to air but impermeable to the semi-dry material; and suction means for creating a suction effect through said permeable surface whereby semi-dry material of the charge can be held against said surface during transfer to the said discharge position; said means for delimiting and transferring the material charge further comprising an adjustable capacity dosage container within which the charge is delimited, the container including a grid bottom permeable to air but impermeable to the semi-dry material, and side walls extending from the bottom to define a material opening; a suction pick-up member carrying said permeable surface; and pick-up member transfer means for moving the suction pick-up member between a charge pick-up position, in which its permeable surface contacts through said material opening the material charge delimited within the dosage container, whereby to enable pick-up of charge, and a position in which the charge is in its discharge position.

2. A metering unit according to claim 1, wherein said means for delimiting and transferring the material charge comprises an adjustable capacity dosage container in which the charge is delimited, said container including said air-permeable surfaces; and means for moving and inverting said dosage container.

3. A metering unit according to claim 1, wherein the dosage container further comprises means for adjusting the effective depth of the dosage container to vary the volume of the charge.

4. A metering unit according to claim 3, wherein said adjustment means comprises spaces arranged between opposing surfaces of the container walls and bottom to enable the position of the grid member to be adjusted relative to the container side walls.

5. A metering unit according to claim 3, wherein said adjustment means comprises screw means between opposing surfaces of the container walls and bottom to enable adjustment of the position of the grid member relative to the container side walls.

6. A metering unit according to claim 1, wherein the dosage container grid bottom comprises a central zone, and an edge portion so arranged, relative to the central zone, that the depth of the dosage container is greatest at its periphery.

7. A metering unit according to claim 6, wherein said central zone of the container grid bottom is substantially flat, and the said edge portion is inclined from the central zone towards the container side walls.

8. A metering unit according to claim 1, further comprising means for completely filling the dosage container with semi-dry material; said last named means comprising a filling chest, a semi-dry material hopper, and means for moving the chest between the hopper and a position overlying the said material opening of the dosage container to enable the container to be filled with material from the chest.

9. A metering unit according to claim 8, wherein the extent of the said air-permeable surface of the suction pick-up member corresponds to that of a mold to be filled, and wherein the extent of the material opening of the dosage container is greater than that of the air-permeable surface such that material around the periphery of the dosage container is not included within the charge delimited therein.

10. A metering unit according to claim 9, wherein the suction pick-up member further comprises a thin blade-like frame which surrounds said air permeable surface and which can penetrate through the semi-dry material whereby, upon the pick-up member being moved into its charge pick-up position, said frame enters through the material opening of the dosage container and penetrates through material held in the container to effect charge delimitation within the container, material around the peripheral portion of the container being excluded from the charge.

11. A metering unit according to claim 10, further comprising a smoothing unit for removing any unwanted material held against the said air-permeable surface following charge pick-up.

12. A metering unit according to claim 1, wherein said suction pick-up member comprises a bell-shaped housing defining a bell opening, and wherein said air-permeable surface comprises a mesh extending across the bell opening; said suction means comprising a fan secured to and communicating with the interior of the housing.

13. A metering unit according to claim 1, wherein the volume of the dosage container is equal to the desired volume of the charge, said pick-up member effecting transfer of all material in the container to a mold to be filled.

14. A metering unit according to claim 1, further comprising means for simultaneously raising the bottom of the container together with raising of the pick-up member from its charge pick-up position, whereby to facilitate charge pick-up and transfer.

15. A metering unit according to claim 1, wherein the said side walls of the container diverge slightly from the container bottom to said material opening thereof.

* * * * *